Patented Oct. 29, 1940

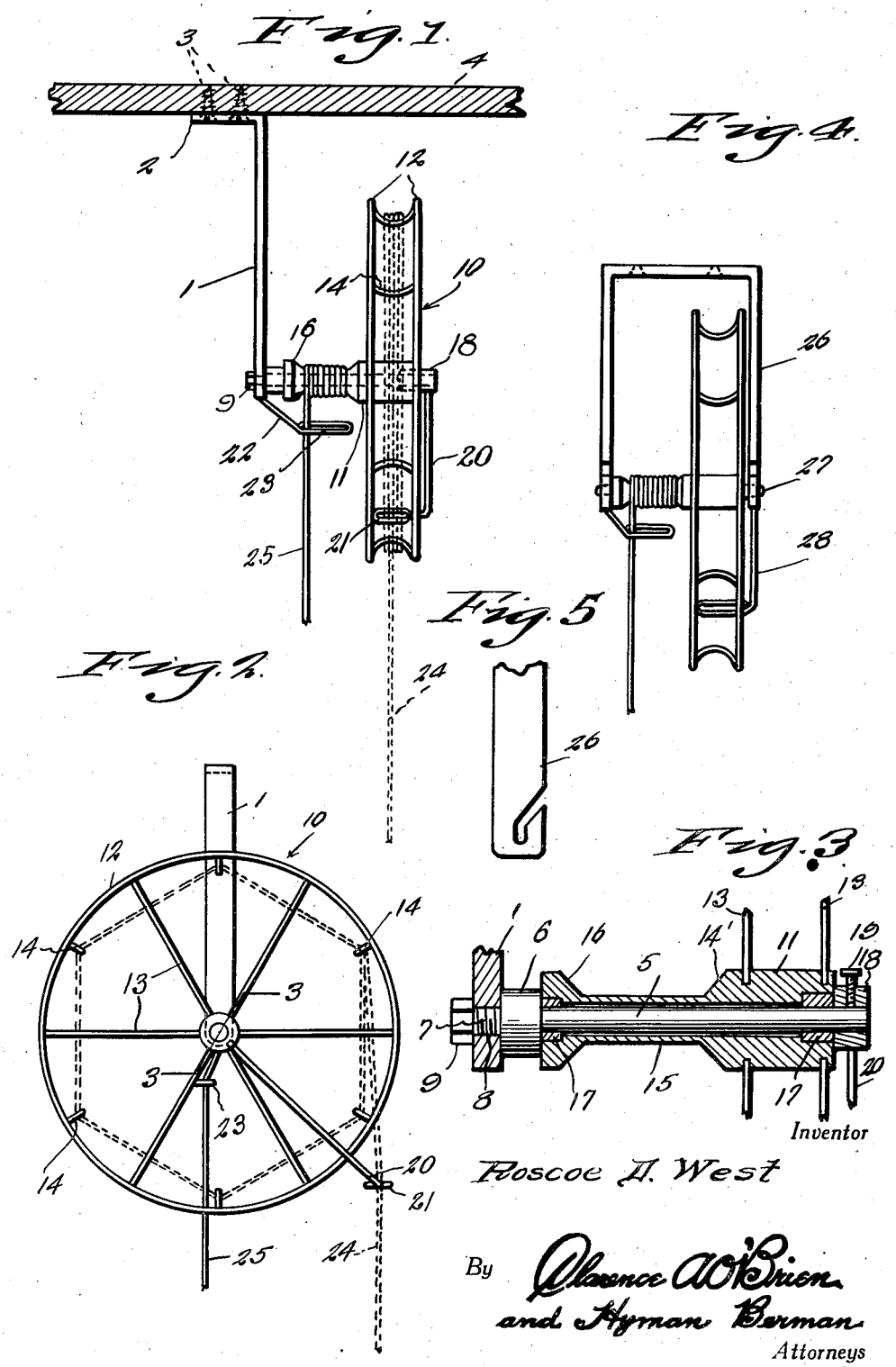

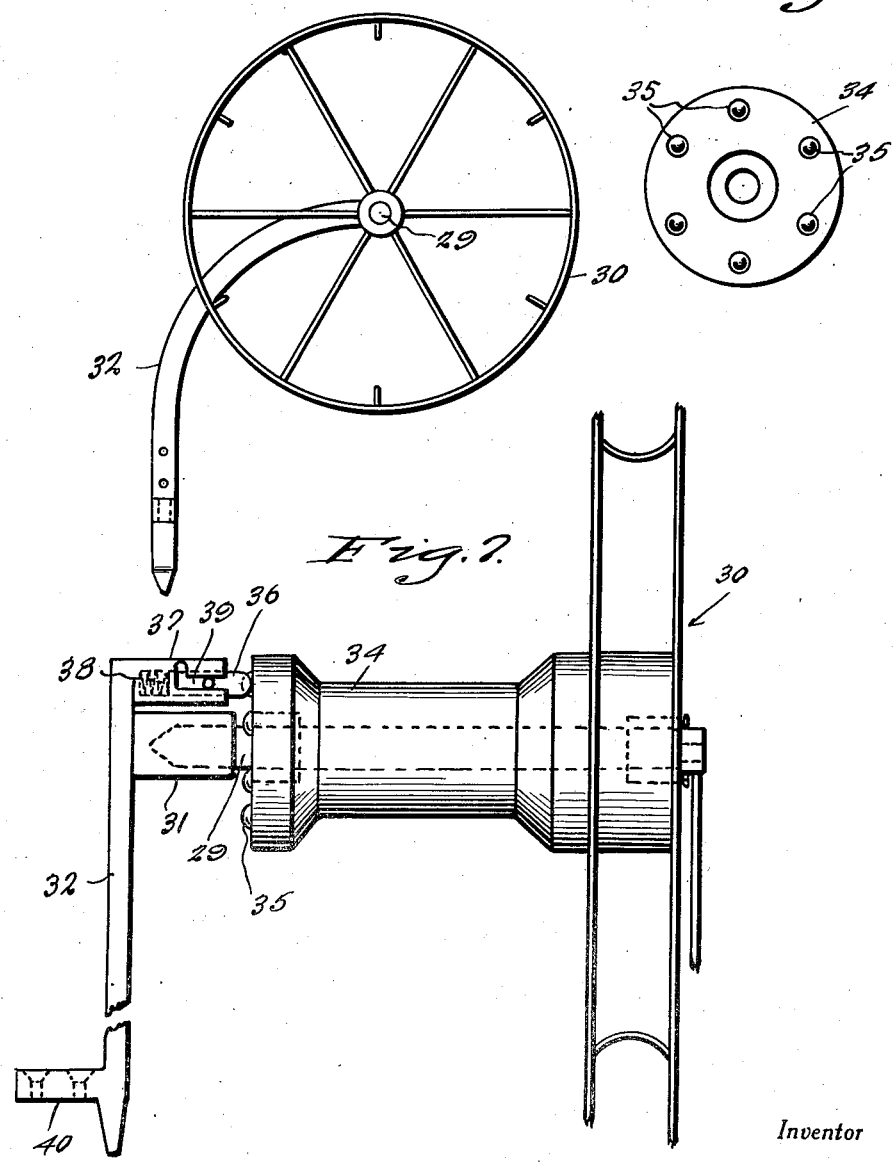

2,219,500

UNITED STATES PATENT OFFICE 2,219,500

FISHING REEL

Roscoe D. West, Flint, Mich.

Application April 4, 1939, Serial No. 265,994

3 Claims. (Cl. 242—77)

My invention relates to improvements in fishing reels for use more particularly in fishing through holes in the ice in a shack or the like erected over the hole, although as will presently appear, the reel of my invention may be used to advantage in fishing from wharves, boats or the like.

The invention is designed with the particular purpose in view of providing a large sized reel of simple, inexpensive construction equipped for winding up the same without a crank or a mechanical drive.

To the accomplishment of the above, and subordinate objects presently appearing, a preferred embodiment of my invention together with certain modified forms thereof have been illustrated in the accompanying drawings, set forth in detail in the succeeding description, and defined in the claims appended hereto.

In said drawings:

Figure 1 is a view in front elevation of the preferred embodiment of my invention.

Figure 2 is a view in side elevation.

Figure 3 is a view in transverse section taken on line 3—3 of Figure 2 and drawn to an enlarged scale.

Figure 4 is a view in front elevation of a modified form of the invention.

Figure 5 is a fragmentary view in elevation of one end of the reel support of the modified form shown in Figure 4.

Figure 6 is a view in side elevation of another modified form of the invention.

Figure 7 is a view in front elevation of the form of the invention shown in Figure 6 and drawn to an enlarged scale, and Figure 8 is a view in elevation of a part presently described in detail.

Referring to the drawings by numerals, and first to the embodiment of the invention shown in Figures 1, 2 and 3, my improved reel in this embodiment comprises a bracket-like reel support 1 or bar-like form and suitable metal having a rightangled end 2 by means of which, and screws 3, said support is adapted for attachment to an overhead rigging represented at 4, or the roof of a shanty, erected over a hole in the ice. As will be understood the support 1 is designed to depend from the rigging 4 alongside a hole cut in the ice and to terminate at a suitable point above the latter. The lower end of the support 1 has extending laterally therefrom a reel spindle 5 having adjacent one end a collar 6, said end being threaded, as at 7, and extended through a suitable aperture 8 in the support 1 to receive a nut 9 whereby the spindle 5 is detachably secured in the support 1 with the collar 6 clamped against said support.

Rotatably mounted on the spindle 5, in a manner presently explained, is a large reel 10 comprising a hub 11, a pair of laterally spaced, concentric, annular rim members 12 mounted on said hub 11 by means of spokes 13 and connected together by circumferentially spaced concaved cross bars 14. The hub 11 has a beveled inner end 14' and an extension 15 of said inner end terminating in a beveled flange 16, said extension and flange forming together with the inner end 14' of the hub a spool of greatly reduced diameter as compared with that of the reel 10. The outer end of the hub 11 and the flange 16 have countersunk therein a pair of anti-friction sleeves 17 rotatably mounted on the spindle 5. A collar 18 clamped on the free end of the spindle 5 by a set screw 19 confines the hub 11 and the described spool on the spindle with the flange 16 of said spool bearing against the collar 6.

The collar 18 has depending therefrom toward the front of the reel 10 a resilient arm 20 terminating in a right angularly related looped end 21 extending across the front of the reel 10 below the axis thereof to form a line guide for a purpose presently seen. A similar arm 22 extends from the lower end of the support 1 with a terminal looped end 23 disposed below the described spool and functioning as another line guide for a purpose presently explained.

The fishing line 24 is suitably secured at one end to one of the cross bars 14 to be wound upon said bars and unwound therefrom under rotation of the reeel as will be obvious. The fishing line 24 is extended through the looped end 21 of the arm 20 to guide the line as it pays off the reel 10 and is wound onto the same. A reel operating line 25 is secured at one end, in any suitable manner, to the described spool to be wound around the same under rotation of the reel 10 in a direction to pay out or unwind the fishing line 24. Preferably the said line 25 is passed through the looped end 23 of the rod 22 so that by pulling on the free end of the line 25 in a direction to bind the same against said end 23 rotation of the reel 10 in an unwinding direction may be retarded, said end 23 acting as a friction brake on the line 25.

The operation of the described form of the invention will be readily understood. As the reel 10 revolves to unwind the fishing line 24, the reel operating line 25 is wound upon the described spool and by a pull on said line 25 unwinding of the fishing line 24 may be opposed as desired. To reel up the fishing line 24 it is merely necessary to pull on the reel operating line 25 whereby the described spool will be rotated in a direction to cause the reel 10 to rotate in a winding up or reeling direction.

In the modified form of the invention shown in Figures 4 and 5 the construction is the same as that previously described, with the exception that the support 26 is of U-shaped form, the spindle 27 is fixed at its opopsite ends in the free ends of the support 26, and the line guide 28 for the fishing line depends from one end of the support 26.

In the form of the invention shown in Figures 6, 7, and 8, the spindle 29 of the reel proper 30 extends into a sleeve 31 on the upper end of an upstanding support 32 in which sleeve it is secured by a press fit therein. In this form of the invention a ratchet brake is provided between the spool 34 and the support 32 as follows. The free, inner end of the spool 34 is provided on the face thereof with a circular series of rounded protuberances 35 which, under rotation of said spool 34, wipingly engage a spring pressed bolt-like detent 36 endwise slidable in a sleeve 37 on the support 32 and spring-pressed, as indicated at 38, in the direction of said end of the spool to be interposed in the path of movement of the protuberances 35. A pin and slot connection 39 guides said detent 36 in its movement toward and from the face of the spool.

As will be manifest, under rotation of the spool 34, and reel 30, said spool is intermittently dogged frictionally by coaction of the detent 36 and protuberances 35 to brake unwinding of the reel 30 under a strong pull against the reel exerted for instance by a large fish. The support 32 is provided with a lateral lug 40 for attachment of the support in upright position to a wharf or the like or to the deck of a boat.

The foregoing will, it is believed, suffice to impart a clear understanding of my invention without further explanation.

Manifestly the invention, as described, is susceptible of modification in other respects than as disclosed, without departing from the inventive concept and right is herein reserved to such other modifications as fall within the scope of the subjoined claims.

What I claim is:

1. In a fishing reel for attachment to a base, a bar-like support, a fixed spindle extending laterally from the support, a reel rotatably mounted on said spindle and having a concentric flanged extension thereon, a fishing line attached at one end to said reel for winding thereon under rotation of the reel in one direction, and a pull line attached at one end to said extension for winding thereon under rotation of the reel in the opposite direction, whereby pull exerted on said pull line causes rotation of said reel in the direction first-mentioned and winding of said fishing line thereon, and a resilient rod fixed at one end on the spindle and having a looped free end extending across the periphery of said reel for the extension of the fishing line therethrough.

2. In a fishing reel for attachment to a base, a bar-like support, a spindle extending laterally from the support, a reel rotatably mounted on said spindle and having a concentric flanged extension thereon, a fishing line attached at one end to said reel for winding thereon under rotation of the reel in one direction, a pull line attached at one end to said extension for winding thereon under rotation of the reel in the opposite direction, whereby pull exerted on said pull line causes rotation of said reel in the direction first mentioned and winding of said fishing line thereon, a resilient rod fixed at one end on the spindle and having a looped free end extending across the periphery of said reel for the extension of the fishing line therethrough, and a similar rod extending from said support and having a looped free end extending along said extension for the passage of the pull line therethrough.

3. In a fishing reel for attachment to a base, a bar-like support, a fixed spindle extending laterally from the support, a reel rotatably mounted on said spindle and having a concentric flanged extension thereon, a fishing line attached at one end to said reel for winding thereon under rotation of the reel in one direction, a pull line attached at one end to said extension for winding thereon under rotation of the reel in the opposite direction, whereby pull exerted on said pull line causes rotation of said reel in the direction first mentioned and winding of said fishing line thereon, and coacting ratchet devices on said support and extension, respectively, frictionally retarding rotation of said extension and reel in opposite directions.

ROSCOE D. WEST.